United States Patent Office 3,302,074
Patented Jan. 31, 1967

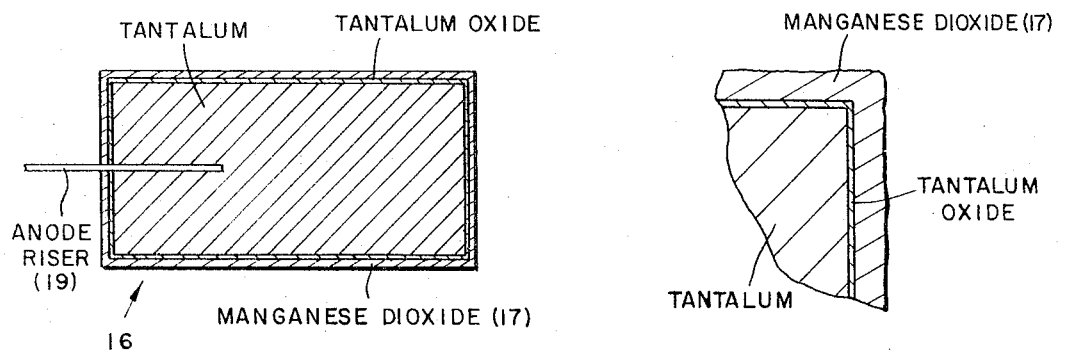
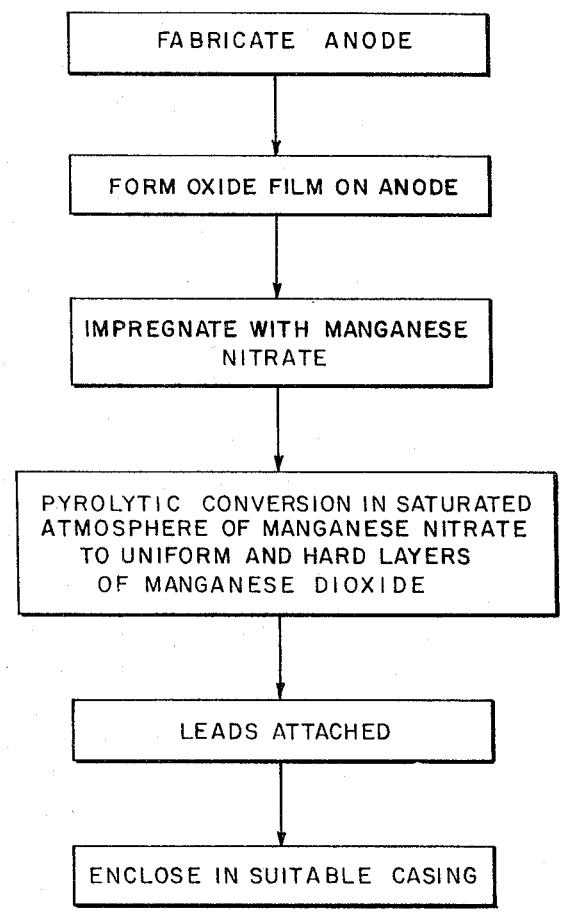
INVENTOR
ROBERT D. BLACK
BY
ATTORNEY

3,302,074
CAPACITOR WITH SOLID OXIDE ELECTROLYTE PYROLYTICALLY PRODUCED IN WET ATMOSPHERE
Robert D. Black, Greencastle, Ind., assignor to P. R. Mallory & Co., Inc., Indianapolis, Ind., a corporation of Delaware
Filed June 29, 1964, Ser. No. 378,821
12 Claims. (Cl. 317—230)

This invention relates to improved means and methods of fabricating solid electrolytic capacitors, and more particularly relates to improvements for converting manganese nitrate into a manganese dioxide coating on a solid tantalum capacitor anode.

Solid electrolytic capacitors have been made by pressing and sintering an anodizable metal as tantalum into a porous pellet, and electrolytically anodizing the pellet to form a thin film of the oxide of the particular metal which serves as the dielectric of the completed unit. The anodized pellet is then impregnated with a compound capable of pyrolytic conversion to a semiconductive metal oxide such as manganese nitrate which serves as the electrolyte, and aids in the repair and reforming of the metal oxide film during operation.

It is known in the art to convert manganese nitrate into a manganese dioxide coating on a solid tantalum capacitor anode by pyrolysis. However, the known methods cause an erratic buildup which must be sized in order to get the anode into a case. This buildup is soft and when a metal coating such as zinc is sprayed onto the anode, the soft manganese dioxide layer chips and flakes, thus resulting in a number of scrapped anodes. It is therefore, desirable to provide a method of pyrolyzing manganese nitrate so that the resulting manganese dioxide coating is uniform and hard. The present invention meets that need.

It is therefore an object of the present invention to provide a method of pyrolyzing manganese nitrate so that the resulting manganese dioxide film is hard and uniform thereby improving the life and electrical properties of solid tantalum capacitors.

The present invention in another of its aspects, relates to novel features of the instrumentalities of the present invention described herein for teaching the principal object of the the present invention and to the novel principles employed in the instrumentalities whether or not these features and principles may be used in the said object or in the said field.

With the aforementioned objects enumerated, other objects will be apparent to those possessing ordinary skill in the art. Other objects will appear in the following description, appended claims and appended drawings. The invention resides in the novel construction, combination, arrangment, and cooperation of elements as hereinafter described and more particularly as defined in the appended claims.

The appended drawings illustrate the novel embodiment of the present invention and are constructed to function in the most advantageous mode devised for practical application of the basic principles involved in the hereinafter described invention.

In the drawings:

FIGURE 1 is a cross sectional view of a capacitor embodying the present invention.

FIGURE 2 is an exploded partial cross sectional view of the capacitor illustrated in FIGURE 3.

FIGURE 3 is a diagrammatic illustration of the method of the present invention.

Generally speaking, the present invention provides a method of pyrolyzing manganese nitrate in a saturated atmosphere, causing the buildup of manganese dioxide on the solid tantalum anode to be uniform and hard, thus eliminating the need for sizing the irregular buildup obtained in the old method before spraying with zinc and placing the anode into the cathode can. The buildup is so hard that it can take rougher handling compared to the buildup produced in the prior method, and DCL leakage levels in general are lower.

When converting manganese nitrate into a manganese dioxide coating on a solid tantalum anode for a capacitor, an erratic buildup which has to be sized in order to fit the anode into a case was obtained. The buildup was very soft and flakey and chipped when zinc sprayed. Typical anodes 10 and 11 as produced by the old method are shown in FIGURE 1. Anodes 10 and 11 having anode risers 12 and 13 are shown before the irregular buildup of manganese dioxide 14. The irregular buildup 14 is obtained when manganese nitrate is heated in a dry atmosphere, as the gaseous action that takes place is extremely vigorous. The action is comparable to boiling water in a dry atmosphere. When water is boiled in a dry atmosphere, the activity of transformation into a gaseous state is in the form of large bubbles being built up and dispersed into the dry atmosphere. However, when water is boiled in a saturated atmosphere, the transformation from the liquid stage to the water vapor stage is less active, as the saturated atmosphere acts as a buffer. The transformation of maganese nitrate into manganese dioxide in a saturated atmosphere acts the same way. When the anode is saturated throughout with manganese nitrate and placed into a saturated atmosphere at high temperature, the activity of transformation throughout the anode, especially on the surface, is buffered by the atmosphere and the resulting buildup of manganese dioxide 17 as shown on anodes 15 and 16 having anode risers 18 and 19 in FIGURE 2 is uniform and hard. The uniform buildup of manganese dioxide in a saturated atmosphere and high temperature is produced by the water molecules in the manganese nitrate being replaced by the water vapor in the atmosphere, therefore, the manganese does not dry out during transformation. The resulting buildup can take rougher handling, has lower DCL leakage levels and results in fewer defective anodes than those produced by the old method, therefore, the overall costs are cut.

In order to carry out the pyrolysis of manganese nitrate to manganese dioxide, a convection oven capable of minimum temperatures of 250° C. having a rotating device for the tantalum anodes and a humidifier capable of producing a minimum relative humidity of 90% in the oven.

Although the present embodiment represents one aspect of the invention, certain variations may be practiced without departing from the scope of the invention. Such modifications in the specific embodiments described above will be readily apparent to those skilled in the art. I consider all of these variations and modifications to be within the foregoing description and defined by the appended claims.

Having thus described my invention, I claim:

1. In a method for making a solid reducible oxide capacitor including the steps of electrolytically forming a dielectric oxide film on the surface of a film-forming metal electrode, covering the surface of the filmed electrode with a solution of a material convertible to a semiconductive reducible oxide, heating said electrode to a temperature for pyrolytically in situ coverting the material of said solution to a layer of semiconductive reducible oxide overlying said dielectric film, and applying a counter electrode of electrically conductive material on the surface of the reducible oxide layer, the improvement comprising: maintaining an atmosphere of about 90% relative humidity surrounding said electrode during the step of heating the electrode for pyrolytically converting the material of the solution to said reducible oxide layer.

2. In a method for making a solid reducible oxide capacitor including the steps of electrolytically forming a dielectric oxide film on the surface of a film-forming metal electrode, covering the surface of the filmed electrode with a solution of a material convertible to a semiconductive reducible oxide, heating said electrode to a temperature for pyrolytically in situ converting the material of said solution to a layer of semiconductive reducible oxide overlying said dielectric film, and applying a counter electrode of electrically conductive material on the surface of the reducible oxide layer, the improvement comprising: maintaining a substantially saturated atmosphere surrounding said electrode during the step of heating the electrode for pyrolytically converting the material of the solution to said reducible oxide layer.

3. In a method for making a solid reducible oxide capacitor including the steps of electrolytically forming a dielectric oxide film on the surface of a film-forming metal electrode, covering the surface of the filmed electrode with a solution of a material convertible to a semiconductive reducible oxide, heating said electrode to a temperature of about 250° C. for pyrolytically in situ converting the material of said solution to a layer of semiconductive reducible oxide overlying said dielectric film, and applying a counter electrode of electrically conductive material on the surface of the reducible oxide layer, the improvement comprising: maintaining a water vapor containing atmosphere surrounding said electrode during the step of heating the electrode for pyrolytically converting the material of the solution to said reducible oxide layer.

4. In a method for making a solid reducible oxide capacitor including the steps of electrolytically forming a dielectric oxide film on the surface of a film-forming metal electrode, covering the surface of the filmed electrode with a solution of a material convertible to a semiconductive reducible oxide, heating said electrode to a temperature of at least 250° C. for pyrolytically in situ converting the material of said solution to a layer of semiconductive reducible oxide overlying said dielectric film, and applying a counter electrode of electrically conductive material on the surface of the reducible oxide layer, the improvement comprising: maintaining an atmosphere of about 90% relative humidity surrounding said electrode during the step of heating the electrode for pyrolytically converting the material of the solution to said reducible oxide layer.

5. In a method for making a solid reducible oxide capacitor including the steps of electrolytically forming a dielectric oxide film on the surface of a porous electrode, covering the surface of the porous electrode with a solution of a material convertible to a semiconductive reducible oxide, heating said electrode to a temperature of at least 250° C. for pyrolytically in situ converting the material of said solution to a layer of semiconductive reducible oxide overlying said dielectric film, and applying a counter electrode of electrically conductive material on the surface of the reducible oxide layer, the improvement comprising: maintaining an atmosphere of about 90% relative humidity surrounding said porous electrode during the step of heating the electrode for pyrolytically converting the mateial of the solution to said reducible oxide layer.

6. In a method for making a solid reducible oxide capacitor including the steps of electrolytically forming a dielectric oxide film on the surface of a tantalum electrode, covering the surface of the filmed electrode with a solution of a material convertible to a semiconductive reducible oxide, heating said tantalum electrode to a temperature of at least 250° C. for pyrolytically in situ converting the material of said solution to a layer of semiconductive reducible oxide overlying said dielectric film, and applying a counter electrode of electrically conductive material on the surface of the reducible oxide layer, the improvement comprising: maintaining an atmosphere of about 90% relative humidity surrounding said tantalum electrode during the step of heating the tantalum electrode for pyrolytically converting the material of the solution to said reducible oxide layer.

7. In a method for making a solid reducible oxide capacitor including the steps of electrolytically forming a dielectric oxide film on the surface of a tantalum electrode, covering the surface of the filmed tantalum electrode with a solution of a manganese salt convertible upon heating to manganese oxide, heating said tantalum electrode to a temperature of at least 250° C. for pyrolytically in situ converting the manganese salt to a layer of manganese oxide overlying said dielectric film, and applying a counter electrode of electrically conductive material on the surface of the manganese oxide layer, the improvement comprising: maintaining a substantially saturated atmosphere surrounding said tantalum electrode during the step of heating the tantalum electrode for pyrolytically converting the manganese salt to said manganese oxide layer.

8. In a method for making a solid reducible dioxide capacitor including the steps of electrolytically forming a dielectric oxide film on the surface of a tantalum electrode, covering the surface of the filmed tantalum electrode with a solution of a manganese salt convertible upon heating to manganese dioxide, heating said tantalum electrode to a temperature of at least 250° C. for pyrolytically in situ converting the manganese salt to a layer of manganese dioxide overlying said dielectric film, and applying a counter electrode of electrically conductive material on the surface of the manganese dioxide layer, the improvement comprising: maintaining an atmosphere of about 90% relative humidity surrounding said tantalum electrode during the step of heating the tantalum electrode for pyrolytically converting manganese salt to said manganese dioxide layer, and including rotating the tantalum electrode during said pyrolytic conversion of the manganese salt.

9. An electrolytic capacitor having an anode of film-forming metal, an anodized dielectric oxide formed on the surface of said anode, a hard manganese dioxide electrolyte in a uniform layer intimately overlying said film, said electrolyte layer being the pyrolytic conversion product of a layer of manganese nitrate in situ converted in an atmosphere of about 90% relative humidity and at a temperature of at least 250° C.

10. An electrolytic capacitor having a porous anode of film-forming metal, an anodized dielectric oxide formed on the surface of said porous anode, a hard manganese dioxide electrolyte in a uniform layer intimately overlying said film, said electrolyte layer being the pyrolytic conversion product of a layer of manganese nitrate in situ converted in a water vapor containing atmosphere wherein water vapor contained in said manganese nitrate is replaced by water vapor from said atmosphere and at a temperature of about 250° C.

11. An electrolytic capacitor having a porous metal anode, an anodized dielectric oxide formed on the surface of said anode, a hard manganese dioxide electrolyte in a uniform layer intimately overlying said film, said electrolyte layer being predeterminately sized and being the pyrolytic conversion product of a layer of manganese salt in situ converted in an atmosphere of about 90% relative humidity and at a temperature of about 250° C.

12. An electrolytic capacitor having a tantalum anode, an anodized dielectric oxide formed on the surface of said tantalum anode, a hard manganese dioxide electrolyte in a uniform layer intimately overlying said film, said electrolyte layer being predeterminately sized and being the pyrolytic conversion product of a layer of manganese nitrate in situ converted in a saturated atmosphere and at a temperature of about 250° C., said saturated atmosphere controlling the activity of the transformation of said manganese nitrate into manganese dioxide.

References Cited by the Examiner
UNITED STATES PATENTS

| | | | |
|---|---|---|---|
| 3,093,883 | 6/1963 | Haring et al. | 29—25.42 |
| 3,111,428 | 11/1963 | Fournier | 317—230 X |

JOHN W. HUCKERT, *Primary Examiner.*

JAMES D. KALLAM, *Examiner.*